United States Patent
Frangi et al.

(10) Patent No.: US 9,316,550 B2
(45) Date of Patent: Apr. 19, 2016

(54) SHOCK SENSOR WITH BISTABLE MECHANISM AND METHOD OF SHOCK DETECTION

(71) Applicant: STMicroelectronics S.r.l., Agrate Brianza (IT)

(72) Inventors: Attilio Frangi, Milan (IT); Biagio De Masi, Pisa (IT); Leonardo Baldasarre, Abbiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 175 days.

(21) Appl. No.: 13/957,065

(22) Filed: Aug. 1, 2013

(65) Prior Publication Data

US 2014/0033964 A1 Feb. 6, 2014

(30) Foreign Application Priority Data

Aug. 1, 2012 (IT) .............................. TO2012A0691

(51) Int. Cl.
*G01L 5/00* (2006.01)
*G01P 15/04* (2006.01)
*G01P 15/06* (2006.01)
(Continued)

(52) U.S. Cl.
CPC ............... *G01L 5/0052* (2013.01); *G01P 15/04* (2013.01); *G01P 15/06* (2013.01); *G01P 15/12* (2013.01); *G01P 15/125* (2013.01); *G01P 15/135* (2013.01); *G01P 15/18* (2013.01); *H01H 35/14* (2013.01); *H01H 35/146* (2013.01);
(Continued)

(58) Field of Classification Search
CPC ......... G01P 15/06; G01P 15/12; G01P 15/18; G01P 15/125; G01P 15/135

USPC ........................................................ 73/12.09
See application file for complete search history.

(56) References Cited

U.S. PATENT DOCUMENTS

| 5,325,880 A | * | 7/1994 | Johnson | .................... F15C 3/04 137/1 |
| 6,239,685 B1 | * | 5/2001 | Albrecht | ................ G11C 23/00 251/129.02 |

(Continued)

FOREIGN PATENT DOCUMENTS

| EP | 0196662 A2 | 10/1986 |
| EP | 1394555 A1 | 3/2004 |

(Continued)

*Primary Examiner* — Lisa Caputo
*Assistant Examiner* — Tran M Tran
(74) *Attorney, Agent, or Firm* — Seed IP Law Group PLLC

(57) ABSTRACT

A shock sensor includes: a supporting body; a bistable mechanism, configured to switch from a first stable mechanical configuration to a second stable mechanical configuration in response to an impact force applied along a detection axis and such as to supply to the bistable mechanism an amount of energy higher than a transition energy; and a detection device, coupled to the bistable mechanism and having a first state, when the bistable mechanism is in an initial stable mechanical configuration and a second state, after the bistable mechanism has made a transition from the initial stable mechanical configuration to a final stable mechanical configuration. The bistable mechanism includes at least one elastic element, constrained to the supporting body in at least two opposite peripheral regions and defining a first concavity in the first stable mechanical configuration and a second concavity, opposite to the first concavity, in the second stable mechanical configuration.

31 Claims, 7 Drawing Sheets

(51) Int. Cl.
  *G01P 15/12* (2006.01)
  *G01P 15/125* (2006.01)
  *G01P 15/135* (2006.01)
  *G01P 15/18* (2013.01)
  *H01H 35/14* (2006.01)
  *H01H 1/00* (2006.01)

(52) U.S. Cl.
  CPC ...... *H01H1/0036* (2013.01); *H01H 2001/0068* (2013.01); *H01H 2001/0078* (2013.01)

(56) References Cited

U.S. PATENT DOCUMENTS

| | | | | |
|---|---|---|---|---|
| 6,303,885 | B1 * | 10/2001 | Hichwa | G02B 6/358 200/181 |
| 6,327,909 | B1 * | 12/2001 | Hung | G01P 15/131 200/181 |
| 6,539,798 | B1 * | 4/2003 | Geiger | G01P 15/06 216/2 |
| 6,737,979 | B1 * | 5/2004 | Smith | G08B 21/18 340/665 |
| 6,858,810 | B2 | 2/2005 | Zerbini et al. | |
| 6,865,313 | B2 * | 3/2005 | Mao | G02B 6/358 200/181 |
| 6,911,891 | B2 * | 6/2005 | Qiu | B81B 3/0051 337/16 |
| 6,924,966 | B2 * | 8/2005 | Prophet | H01H 1/0036 361/206 |
| 7,075,209 | B2 * | 7/2006 | Howell | B81C 99/006 200/181 |
| 7,148,436 | B1 * | 12/2006 | Lee | H01H 1/0036 200/181 |
| 7,196,450 | B2 * | 3/2007 | Pinkerton | B82Y 10/00 310/309 |
| 7,273,762 | B2 * | 9/2007 | Gogoi | B81C 1/00936 438/50 |
| 7,283,030 | B2 * | 10/2007 | Cabal | H01H 61/02 310/307 |
| 7,383,774 | B1 * | 6/2008 | Koehler | F42C 15/005 102/222 |
| 7,489,228 | B2 * | 2/2009 | Robert | H01H 1/0036 310/307 |
| 7,508,294 | B2 * | 3/2009 | Cabal | H01H 61/02 310/307 |
| 7,518,283 | B2 * | 4/2009 | Pinkerton | B81B 3/0018 257/415 |
| 7,554,342 | B2 * | 6/2009 | Messenger | G01D 5/18 324/415 |
| 7,616,013 | B2 * | 11/2009 | Messenger | G01D 5/18 324/415 |
| 7,742,215 | B2 * | 6/2010 | Hagood, IV | G02B 6/0043 359/233 |
| 7,920,135 | B2 * | 4/2011 | Sampsell | G09G 3/3466 345/204 |
| 7,999,201 | B2 * | 8/2011 | Zhe | G01P 15/08 200/61.45 R |
| 8,148,874 | B2 * | 4/2012 | Xie | B81B 3/0035 310/307 |
| 8,169,679 | B2 * | 5/2012 | Wu | B81B 1/00 359/234 |
| 8,203,775 | B1 * | 6/2012 | Yin | G02B 26/0866 359/221.2 |
| 8,232,858 | B1 * | 7/2012 | Garcia | B81B 3/0024 337/333 |
| 8,375,767 | B2 * | 2/2013 | Zadesky et al. | 73/12.01 |
| 9,082,353 | B2 * | 7/2015 | Lewis | G02B 26/0841 |
| 2004/0129989 | A1 | 7/2004 | Zerbini et al. | |
| 2005/0252308 | A1 * | 11/2005 | Hjelt | G01P 15/06 73/862.041 |
| 2008/0202258 | A1 | 8/2008 | Amin et al. | |
| 2008/0224879 | A1 * | 9/2008 | Zadesky | G01P 15/06 340/653 |
| 2011/0100124 | A1 | 5/2011 | Zadesky et al. | |
| 2012/0132003 | A1 | 5/2012 | Comi et al. | |
| 2014/0165724 | A1 * | 6/2014 | Krylov | G01P 15/097 73/514.15 |

FOREIGN PATENT DOCUMENTS

| | | |
|---|---|---|
| EP | 1835294 A1 | 9/2007 |
| FR | 2161233 A5 | 7/1973 |

\* cited by examiner

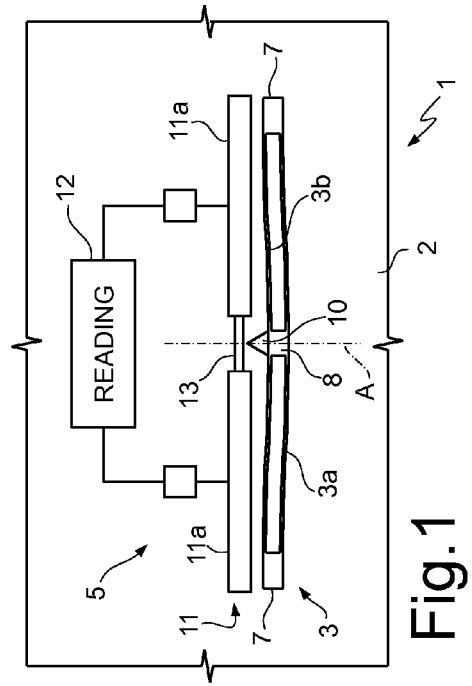
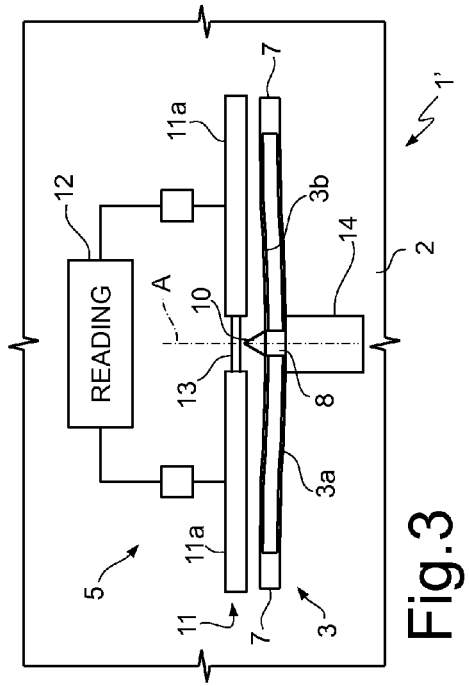
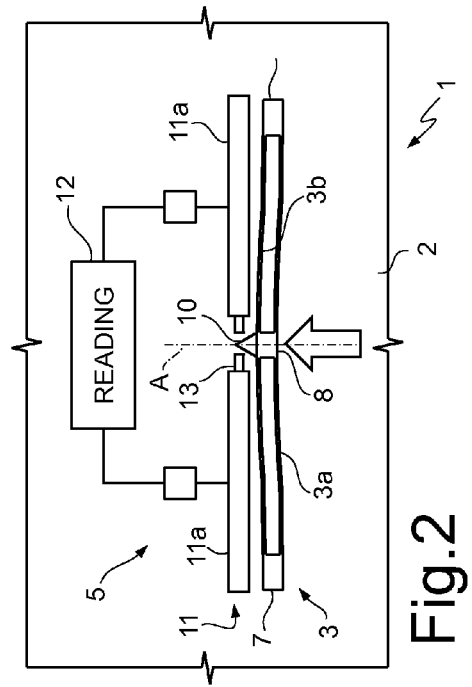
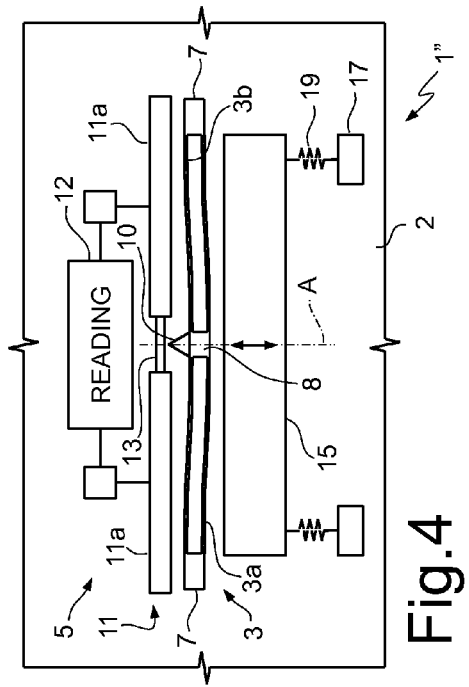

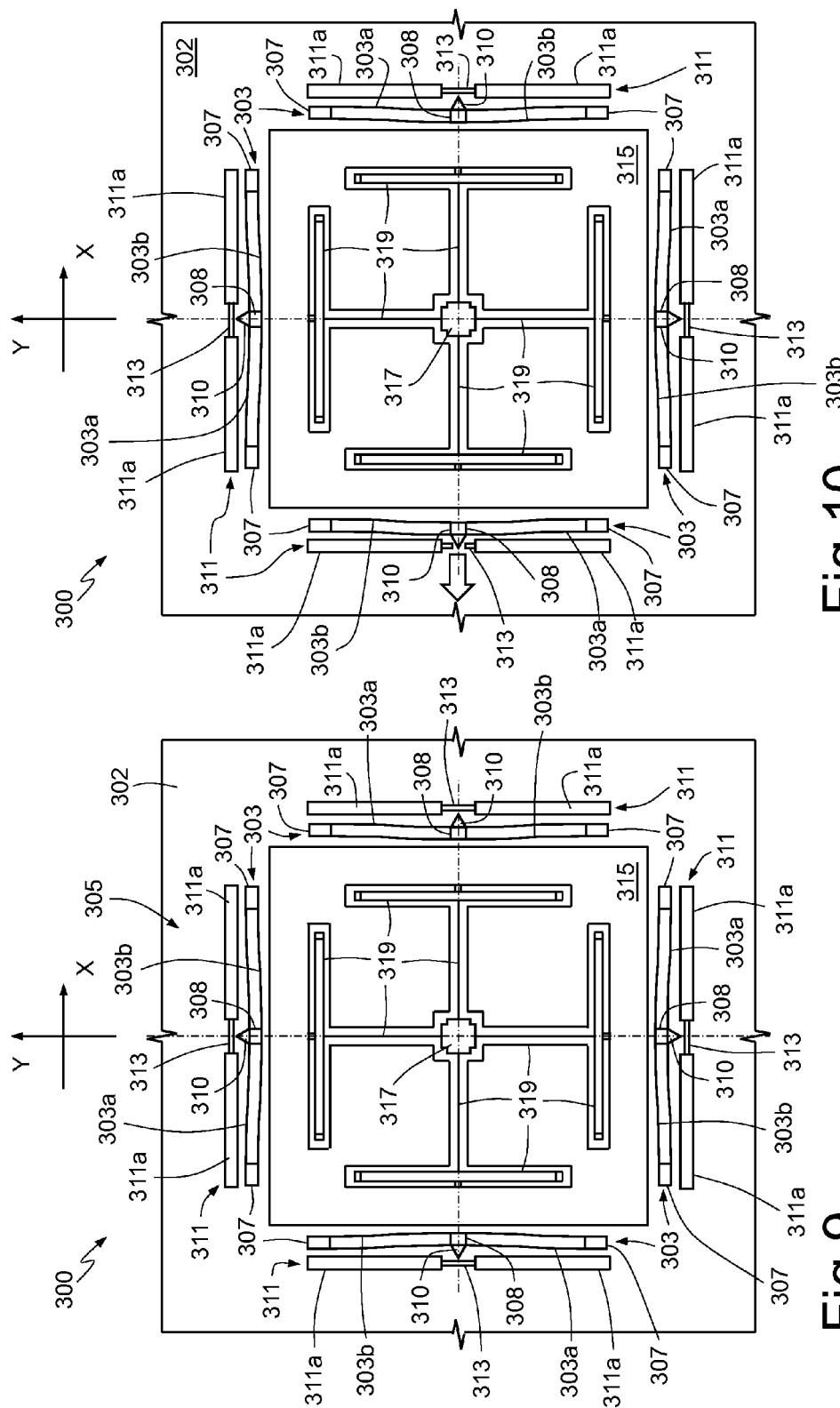

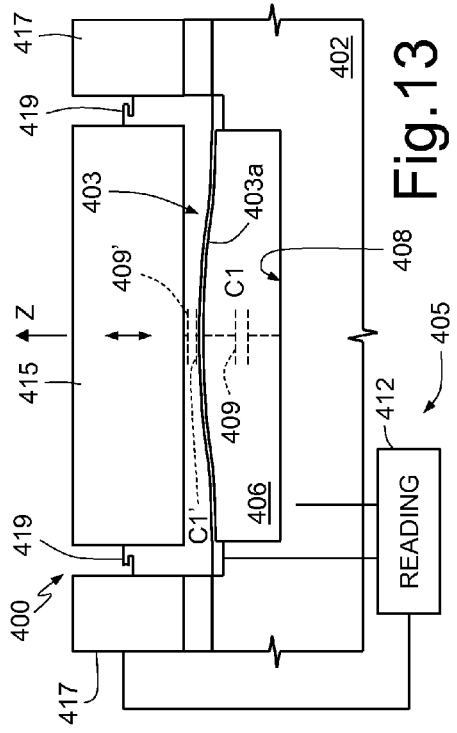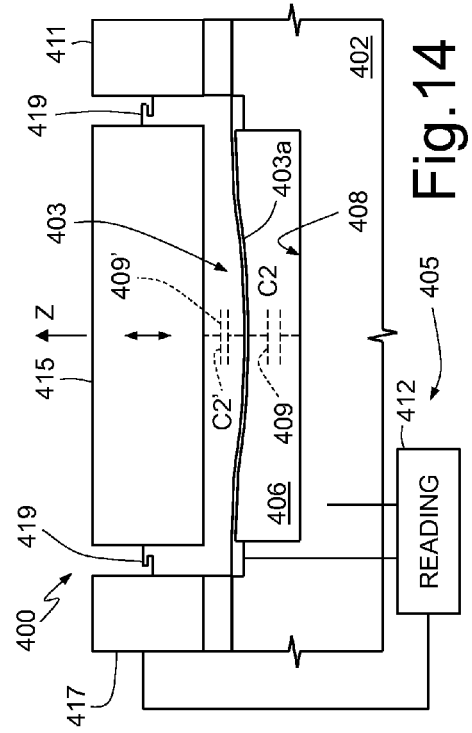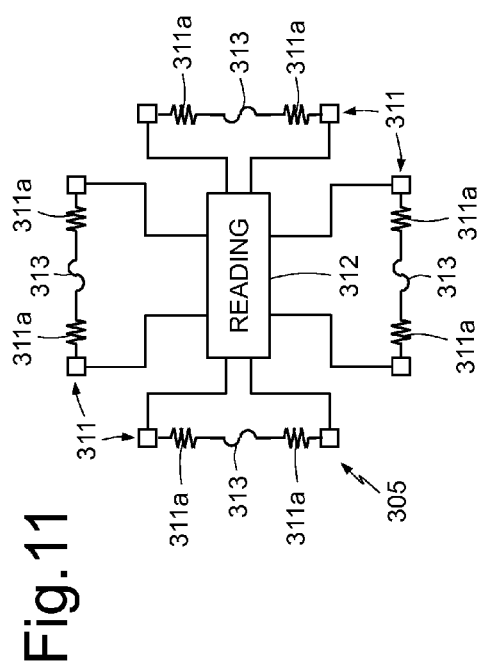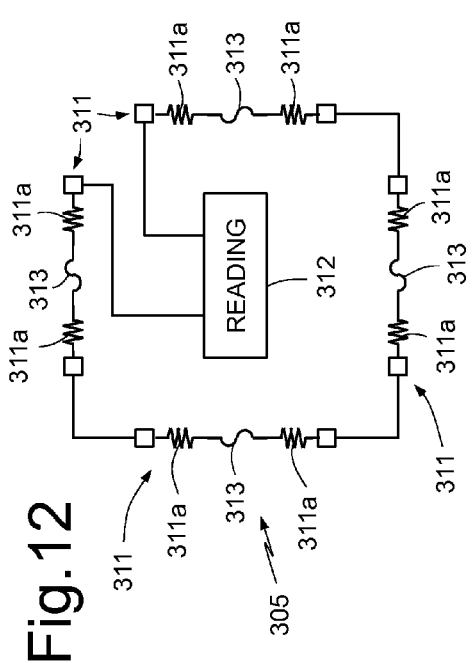

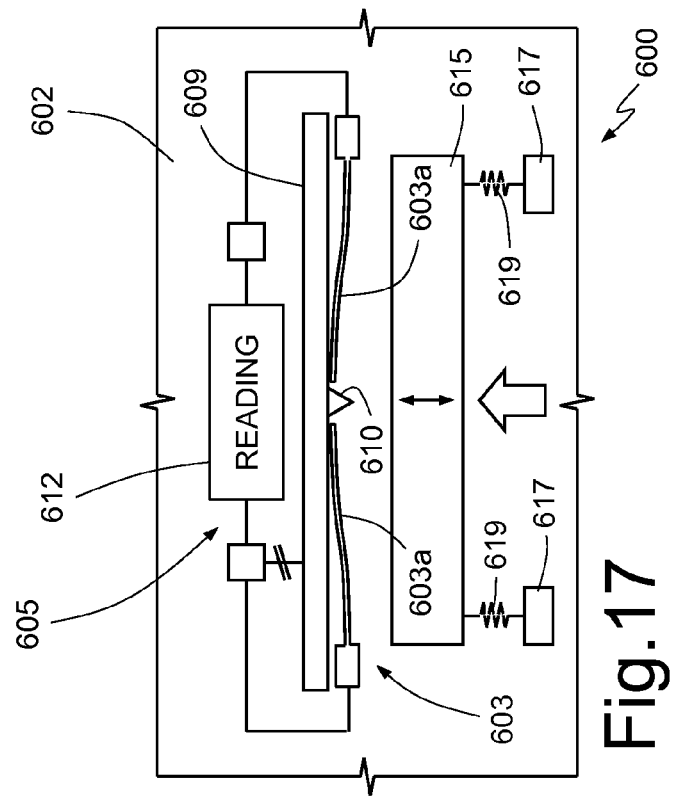
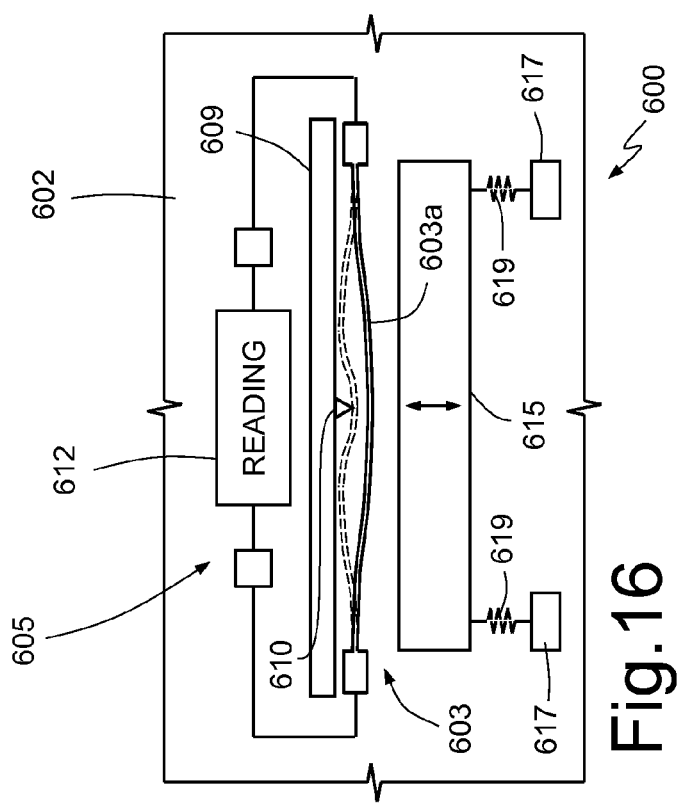
Fig. 16
Fig. 17

SHOCK SENSOR WITH BISTABLE MECHANISM AND METHOD OF SHOCK DETECTION

BACKGROUND

1. Technical Field

The present invention relates to a shock sensor with bistable mechanism and to a method of shock detection.

2. Description of the Related Art

On many occasions, it is useful to know whether a given device or object, such as, for example but not only, a portable electronic device, has undergone shocks of an intensity such as to cause potential damage. This type of information may prove useful for various reasons and may make it possible, among other things, to facilitate diagnostic procedures, offer a guide to the choice of the most appropriate maintenance intervention and verify that the use of the device has been in compliance with the specifications. Likewise, it is possible to check, for example for insurance purposes, whether an object entrusted to a delivery carrier has suffered damage during transport.

Generally, for such purposes as these it is not necessary to measure precisely all the stresses to which the device has been subjected, whereas it is desired to keep track of the occurrence of a potentially harmful impact. More precisely, the important information regards whether at least one impact of intensity higher than a given threshold has occurred or not.

Several kinds of sensors are known, in particular of a microelectromechanical type, which may be used in monitoring the impact undergone in the course of the service life of a device.

Active sensors, based for example on MEMS (microelectromechanical systems) accelerometers, are extremely accurate and reliable and thus enable storage of large amounts of precise data. However, for many applications such a high level of accuracy is not needed and it is sufficient to store a single event. The cost of active sensors is consequently not justified. Moreover, the power consumption of active sensors is considerable and may significantly affect the autonomy of the devices in which the sensors themselves are incorporated.

Passive shock sensors, on the other hand, are inexpensive and the power consumption is negligible or even zero, but in general the control of the threshold is somewhat approximate. For example, the document EP 1 394 555 and the equivalent document U.S. Pat. No. 6,858,810 describe a semiconductor shock sensor, which comprises a supporting body and a movable mass, connected to the supporting body by suspension springs. The supporting body and the movable mass are moreover connected by sample elements, defined by elastic conductive elements (in particular, made of doped polycrystalline silicon) having weakening regions. When the sensor undergoes an acceleration, the mass translates according to the degrees of freedom allowed by the system of suspension springs and subjects the sample elements to stress. If the acceleration exceeds a threshold along at least one axis, the weakening regions of the sample elements break. The state of the sample elements (intact or interrupted) may be easily determined by applying a voltage at the ends of the sample elements themselves: if the sample elements are intact, the voltage causes a current to flow, whereas the current is zero if the sample elements are interrupted. The shock sensor is relatively simple and inexpensive to produce, can be easily integrated in a semiconductor chip and then incorporated in any electronic device and requires an electric power supply exclusively for reading. However, the threshold for ultimate tensile strength of the sample elements can be determined only with a degree of approximation that is frequently unsatisfactory, both because the dynamics of the breaking processes are largely unforeseeable and the process spread cannot be eliminated. The accuracy of this type of shock sensors can hence prove insufficient.

Other types of shock sensors, described in US 2011/0100124, are based upon a chamber containing a conductive liquid and having a wall configured to break following an impact of intensity higher than a given threshold. In this case, the liquid comes out into a second chamber and closes the contact between two electrical terminals. The same document describes also shock sensors that comprise a magnetic element held suspended by a conductive spring between metal walls. Following upon an impact of sufficient intensity, the magnetic element comes into contact with one of the two walls and also in this case brings about closing of an electrical circuit that comprises the magnetic element, the spring and the walls.

In either case, the structures are rather complicated and it is desired to use materials that are far from suited to being integrated in processes for manufacturing semiconductor microelectromechanical devices. The shock sensors described in US 2011/0100124 envisage in fact structures encapsulated in chambers, which are problematical if not impossible to produce with the techniques of manufacture of integrated circuits. In particular, it is problematical to provide a conductive liquid in a closed chamber contained inside another chamber. Moreover, also the accuracy of the shock sensors remains in any case unsatisfactory. In one case, in fact, the force threshold is determined by breaking of a diaphragm and in the other case, the force threshold is determined by the balance between magnetic forces and elastic return forces and hence depends upon the geometry, the characteristics of the spring and the process spread. All the types of shock sensors are in any case far from suited to being incorporated in electronic devices, especially portable ones.

BRIEF SUMMARY

According to embodiments of the present disclosure, there is provided a shock sensor and a method for detecting shocks.

In one embodiment there is provided a shock sensor that includes a supporting body and a bistable mechanism. The bistable mechanism is configured to switch from a first stable mechanical configuration to a second stable mechanical configuration in response to an impact force that is greater than a threshold value. The shock sensor includes a detection device configured to detect the switch from the first stable mechanical configuration to the second stable mechanical configuration.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIG. 1 is a simplified top plan view of a shock sensor according to one embodiment of the present disclosure, in a first operating configuration;

FIG. 2 is a top plan view of the shock sensor of FIG. 1, in a second operating configuration;

FIG. 3 is a simplified top plan view of a shock sensor according to another embodiment of the present disclosure;

FIG. 4 is a simplified top plan view of a shock sensor according to another embodiment of the present disclosure;

FIG. 9 is a simplified top plan view of a shock sensor according to another embodiment of the present disclosure, in a first operating configuration;

FIG. 10 is a top plan view of the shock sensor of FIG. 9, in a second operating configuration;

FIG. 11 is a simplified electrical diagram of the shock sensor of FIG. 9;

FIG. 12 is a simplified electrical diagram of a shock sensor according to another embodiment of the present disclosure;

FIG. 13 is a simplified cross-sectional view of a shock sensor according to another embodiment of the present disclosure, in a first operating configuration;

FIG. 14 is a cross-sectional view of the shock sensor of FIG. 13, in a second operating configuration;

FIG. 16 is a simplified top plan view of a shock sensor according to another embodiment of the present disclosure, in a first operating configuration;

FIG. 17 is a top plan view of the shock sensor of FIG. 16, in a second operating configuration.

DETAILED DESCRIPTION

Figure 5:
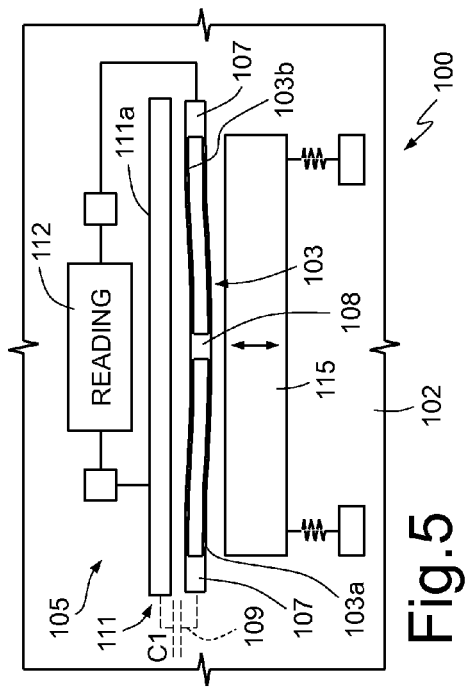
FIG. 5 is a simplified top plan view of a shock sensor according to another embodiment of the present disclosure, in a first operating configuration.

With reference to FIGS. 1 and 2, a shock sensor according to an embodiment of the present disclosure is designated as a whole by 1 and comprises a supporting body 2, a bistable mechanism 3 and a detection device 5 coupled to the bistable mechanism 3.

The supporting body 2 may be a substrate or another semiconductor layer, for example of monocrystalline or polycrystalline silicon, possibly incorporating metal regions and dielectric regions, for example made of silicon oxide or silicon nitride, with a structural function and/or function of electrical insulation.

The bistable mechanism 3 has a first stable mechanical configuration and a second stable mechanical configuration. In an initial state, the bistable mechanism 3 is in the first stable mechanical configuration and switches to the second stable mechanical configuration when it is subjected to a impact force applied along a detection axis A and is higher than a force threshold. The first stable mechanical configuration and the second stable mechanical configuration are defined by respective configurations of minimum of potential energy of the bistable mechanism 3. The bistable mechanism 3 switches between the first stable mechanical configuration and the second stable mechanical configuration when it is subjected to a force such as to transfer to the bistable mechanism 3 itself an energy higher than a transition energy. When a force is applied to the bistable mechanism 3 along the detection axis A, in particular as a result of an acceleration due to impact, the bistable mechanism 3 undergoes deformation and assumes intermediate configurations, associated to which are higher levels of potential energy. If the impact force applied is less than the force threshold, the bistable mechanism 3 returns in any case into the initial stable mechanical configuration after the force has been removed. If, instead, the impact force applied exceeds the force threshold, the bistable mechanism goes rapidly into the stable mechanical configuration opposite to the initial one, even though the impact force ceases to be applied. The energy accumulated as a result of the impact force triggers the transition between the stable mechanical configurations and is released, once the force threshold is exceeded, in the passage from an intermediate deformed configuration to the final stable mechanical configuration. Here and in what follows, it is understood that the impact force is higher than the force threshold and is applied for a time sufficient to provide the bistable mechanism 3 with an energy higher than the transition energy. Also considering the dimensions of the micro electromechanical devices, this situation normally arises in the event of impact for example due to falling. Hence, as a rule reference can be made just to the force threshold substantially for all practical applications of shock sensors. In particular, in the design stage the force threshold may be used as parameter for defining, with sufficient accuracy, the conditions for switching from the first stable mechanical configuration to the second stable mechanical configuration and vice versa.

In the embodiment described herein, the force is generated by the mass of the bistable mechanism itself following upon sudden deceleration of the supporting body 2 caused by impact.

The bistable mechanism 3 comprises a system of linear elastic elements. In one embodiment, in particular, the bistable mechanism 3 comprises a first elastic plate element 3a and a second elastic plate element 3b, defined by respective flexible beams of semiconductor material. As an alternative, the elastic plate elements 3a, 3b may be made of other materials, such as glass or metal. The first elastic plate element 3a and the second elastic plate element 3b have respective ends fixed to a surface of the supporting body 2 by anchorages 7 and for the remaining portion are movable parallel to the surface of the supporting body 2 between the first stable mechanical configuration and the second stable mechanical configuration. Moreover, a bridge element 8 joins central portions of the first elastic plate element 3a and of the second elastic plate element 3b.

In the first stable mechanical configuration and in the second stable mechanical configuration, the first elastic plate element 3a and the second elastic plate element 3b have an arched shape and a geometry selected according to the desired force threshold and are mutually parallel. More specifically, in the first stable mechanical configuration, the first elastic plate element 3a and the second elastic plate element 3b define respective first concavities, open on the side facing the detection device 5. In the second stable mechanical configuration, however, the first elastic plate element 3a and the second elastic plate element 3b define respective second concavities, open on the side opposite to the detection device 5. Consequently, the average distance between the bistable mechanism 3 and the detection device 5 is greater in the first stable mechanical configuration than in the second stable mechanical configuration.

In one embodiment, the bistable mechanism 3 comprises a sharp element 10, carried by the second elastic plate element 3b on the side facing the detection device 5. The sharp element 10 is arranged in a region of the second elastic plate element 3b that presents the greatest displacement between the first stable mechanical position and the second stable mechanical position, i.e., in the embodiment described, a central region of the second elastic plate element 3b.

The detection device 5 is coupled to the bistable mechanism 3 and has a first state, when the bistable mechanism 3 is in the first stable mechanical configuration, and a second state, when the bistable mechanism 3 is in the second stable mechanical configuration.

In greater detail, the detection device 5 comprises a conductive structure 11 and a reading unit 12. The conductive structure 11 is made, for example, of polycrystalline silicon and comprises structural portions 11a, fixed to the supporting body 2 and facing the bistable mechanism 3. In one embodiment, the structural portions define substantially rectilinear and aligned electrodes. The structural portions 11a are set a distance apart from one another and are connected together by a conductive test element 13, which is made of polycrystalline silicon as well. More precisely, the conductive test element 13 is suspended above the supporting body 2 and faces the central portion of the bistable mechanism 3, where the sharp element 10 is located. Moreover, the conductive test element 13 is set at a distance from the bistable mechanism 3 such that the sharp element 10 penetrates through the conductive test element 13 itself and causes breaking thereof, when the bistable mechanism 3 switches from the first stable mechanical configuration to the second stable mechanical configuration.

The bistable mechanism 3 and the conductive test element 13 are selected so that the energy that breaks the conductive test element 13 is less than the energy released by the bistable mechanism 3 in the transition from the first stable mechanical configuration to the second stable mechanical configuration. The sharp element 10 concentrates the force impressed by the bistable mechanism 3, favoring breaking of the conductive test element 13.

The reading unit 12 has terminals connected to the conductive structure 11 so as to form an electrical circuit that includes the conductive test element 13. The reading unit 12 is moreover configured to recognize in which stable mechanical configuration the bistable mechanism 3 is, on the basis of the state of the conductive test element 13. More precisely, the reading unit 12 recognizes a closed circuit state (first state), when the conductive test element 13 is intact, and an open circuit state (second state), when the conductive test element 13 is interrupted, and consequently determines that the bistable mechanism 3 is in the first stable mechanical configuration and in the second stable mechanical configuration, respectively.

As already mentioned, the bistable mechanism 3 is initially set in the first stable mechanical configuration and the conductive test element 13 is intact. If the shock sensor undergoes a stress (in particular a deceleration) along the detection axis A such that an impact force (due to inertia) higher than the force threshold is applied to the bistable mechanism 3, the bistable mechanism 3 suddenly switches to the second stable mechanical configuration and causes breaking of the conductive test element 13.

The reading unit 12 enables determination of the condition of the conductive test element 13 and hence of the state of the detection device 5, as already described.

The bistable mechanism 3 hence operates as storage element and indicates whether the shock sensor 1 has received at least one stress higher than the force threshold.

Advantageously, the force threshold is determined only by the mechanical characteristics of the bistable mechanism 3, which can be calculated and controlled with high precision in the manufacturing stage, notwithstanding the inevitable process spread. Breaking of the conductive test element 13 is not critical and does not affect the force threshold. In other words, the bistable mechanism 3 and the conductive test element 13 may be easily designed so that switching from the first stable mechanical configuration to the second stable mechanical configuration inevitably causes the conductive test element 13 to break, due to the energy rapidly released in the final transition step.

Moreover, the shock sensor 1 may be easily produced using conventional techniques for manufacture of semiconductors, in particular techniques for making microelectromechanical systems. Since a purely mechanical action is exploited, the shock sensor 1 is of a passive type and requires an altogether negligible amount of energy only in the step of reading of the state of the detection device 5.

The shock sensor 1 is hence particularly suited to being incorporated in portable electronic devices with autonomous power supply, such as cell phones, portable computers, video cameras, photographic cameras, multimedia readers, portable apparatuses for video-games, motion-activated user interfaces for computers or consoles for video-games, satellite navigation devices and the like, watches. Moreover, the shock sensor 1 can be advantageously used for monitoring events that are potentially harmful for an object to which the shock sensor 1 itself is applied, such as, for example, a parcel entrusted to a delivery carrier.

In the embodiment illustrated in FIG. 3, a shock sensor 1' comprises the bistable mechanism 3 and the detection device 5 already illustrated with reference to FIGS. 1 and 2. The shock sensor 1' moreover includes an auxiliary mass 14, which is movable with respect to the supporting body 2 and is rigidly connected to the bistable mechanism 3. The auxiliary mass 14, which is made of a semiconductor material in one embodiment, allows to increase the force applied to the bistable mechanism 3 given the same acceleration. In this way, it is possible to reduce significantly the dimensions of the shock sensor 1. While, in fact, the elastic plate elements 3a, 3b, for the function performed, are made as thin plates, the auxiliary mass 14 may have a more compact and hence less cumbersome configuration and even so be sufficient to trigger transition of the bistable mechanism 3 from the first stable mechanical configuration to the second stable mechanical configuration.

In the embodiment illustrated in FIG. 4, a shock sensor 1" comprises the bistable mechanism 3 and the detection device 5 already illustrated with reference to FIGS. 1 and 2. The shock sensor 1' moreover includes an auxiliary mass 15, which is movable with respect to the supporting body 2 and the bistable mechanism 3 and functions as actuator member for the bistable mechanism 3 itself More precisely, the auxiliary mass 15 is constrained to the supporting body 2 by anchorages 17 and elastic suspension elements 19, configured to allow, for the auxiliary mass 15, a translational degree of freedom according to the detection axis A with respect to the supporting body 2 and to allow oscillations about a resting position.

Here and in what follows, the expression "according to an axis" will be used to indicate movements along an axis or about an axis, according to whether the movements allowed for the masses by the respective degrees of freedom are translational or else rotary, respectively. Likewise, the expression "according to a degree of freedom" will be used to indicate translational or rotary movements, as allowed by the degree of freedom itself In the specific case, the auxiliary mass 15 is movable along the detection axis A with respect to the supporting body 2.

In the resting position, the auxiliary mass 15 may indifferently be placed in the proximity of the bistable mechanism 3, with slight play (as in the example of FIG. 4), or else in contact with the bistable mechanism 3. In the embodiment illustrated, in particular, the auxiliary mass 15 is set in the proximity of the first elastic plate element 3a.

Figure 6:
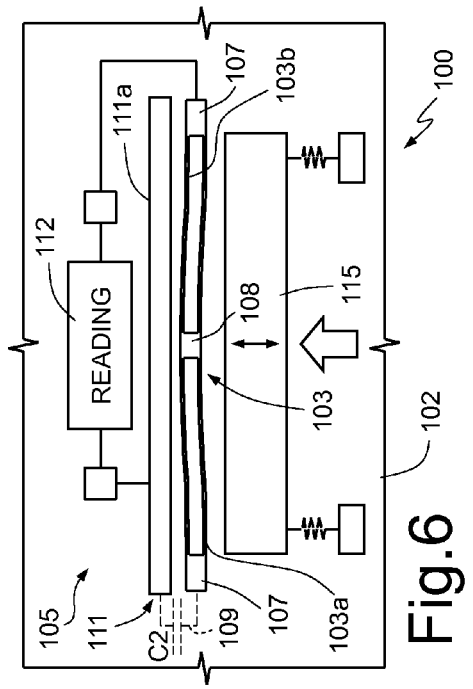
FIG. 6 is a top plan view of the shock sensor of FIG. 5, in a second operating configuration.

Another embodiment of the disclosure is illustrated in FIGS. 5 and 6. In this case, a shock sensor 100 comprises a supporting body 102, a bistable mechanism 103 and a detection device 105 coupled to the bistable mechanism 103.

The bistable mechanism 103 has a first stable mechanical configuration and a second stable mechanical configuration and comprises a first elastic plate element 103a and a second elastic plate element 103b, made of doped semiconductor material and substantially configured as already described with reference to FIGS. 1 and 2. In particular, the first elastic plate element 103a and the second elastic plate element 103b are connected at the center by a bridge element 108, have respective ends fixed to a surface of the supporting body 102 by anchorages 107 and for the remaining portion are movable parallel to the surface of the supporting body 102 between the first stable mechanical configuration and the second stable mechanical configuration. In the first stable mechanical configuration and in the second stable mechanical configuration, the first elastic plate element 103a and the second elastic plate element 103b have an arched shape and are mutually parallel. More specifically, in the first stable mechanical configuration, the first elastic plate element 103a and the second elastic plate element 103b define respective first concavities, open on the side facing the detection device 105. In the second stable mechanical configuration, however, the first elastic plate element 103a and the second elastic plate element 103b define respective second concavities, open on the side opposite to the detection device 105.

The detection device 105 is coupled to the bistable mechanism 103 and has a first state, when the bistable mechanism 103 is in the first stable mechanical configuration and a second state, when the bistable mechanism 103 is in the second stable mechanical configuration.

The detection device 105 comprises a capacitive structure 111, a reading unit 112 and an auxiliary mass 115.

The capacitive structure 111 comprises an electrode 111a, facing the bistable mechanism 103 and the elastic element of the bistable mechanism 103 which is set closer to the electrode 111a (in this case, the second elastic plate element 103b). In one embodiment, the electrode 111a is a bar of doped semiconductor material, is substantially rectilinear and extends parallel to a line joining the anchorages 107.

In a different embodiment, the electrode 111a may be made of metal.

The electrode 111a and the second elastic plate element 103b are capacitively coupled and form a capacitor 109, the capacitance of which depends upon the configuration of the bistable mechanism 103. The first state and second state of the detection device 105 are in fact identified, respectively, by a first capacitance value C1 (FIG. 5) and by a second capacitance value C2 (FIG. 6) of the capacitor 109. Since the average distance between the bistable mechanism 103 and the detection device 105 is greater in the first stable mechanical configuration than in the second stable mechanical configuration, the first capacitance C1 is less than the second capacitance C2.

The reading unit 112 has terminals connected, respectively, to the electrode 111a and to the second elastic plate element 103b and is configured to carry out capacitance reading and to recognize in which stable mechanical configuration the bistable mechanism 103 is set, on the basis of the capacitance value read (C1 for the first state and C2 for the second state).

Figure 7:
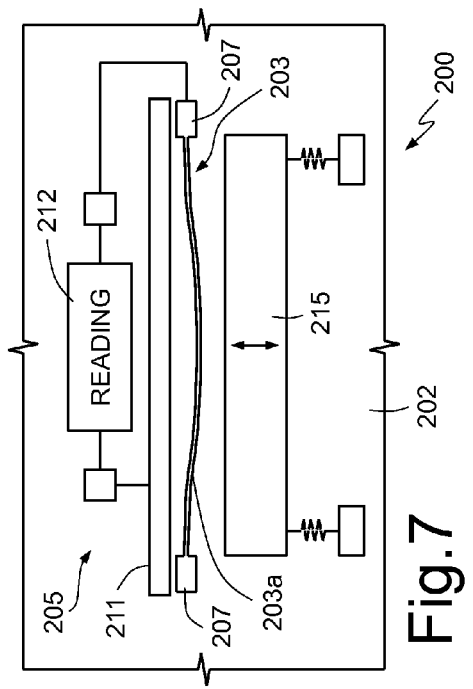
FIG. 7 is a simplified top plan view of a shock sensor according to another embodiment of the present disclosure, in a first operating configuration.
Figure 8:
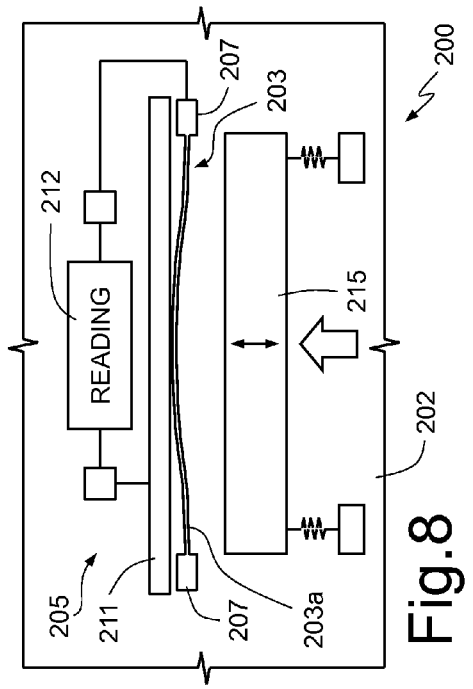
FIG. 8 is a top plan view of the shock sensor of FIG. 7, in a second operating configuration.

Another embodiment of the disclosure is illustrated in FIGS. 7 and 8. In this case, a shock sensor 200 comprises a supporting body 202, a bistable mechanism 203 and a detection device 205 coupled to the bistable mechanism 203.

The bistable mechanism 203 has a first stable mechanical configuration and a second stable mechanical configuration and comprises an elastic plate element 203a made of doped semiconductor material.

In particular, the elastic plate element 203a has an arched shape, has ends fixed to a surface of the supporting body 202 by anchorages 207 and for the remaining portion is movable parallel to the surface of the supporting body 202 between the first stable mechanical configuration and the second stable mechanical configuration. In the first stable mechanical configuration, the elastic plate element 203a defines a first concavity, open on the side facing the detection device 205. In the second stable mechanical configuration, instead, the elastic plate element 203a defines a second concavity, open on the side opposite to the detection device 205.

The detection device 205 comprises an electrode 211, the elastic plate element 203a of the bistable mechanism 203, a reading unit 212 and an auxiliary mass 215.

The electrode 211 faces the bistable mechanism 203 so as to be in contact with the elastic plate element 203a when the bistable mechanism 203 is in the second stable mechanical configuration.

The reading unit 212 has terminals connected to the electrode 211 and to the elastic plate element 203a so as to form an electrical circuit open or closed according to whether the bistable mechanism is in the first stable mechanical configuration or in the second stable mechanical configuration. The reading unit 212 is moreover configured to recognize in which stable mechanical configuration the bistable mechanism 203 is set, on the basis of the state of the circuit including the electrode 211 and the elastic plate element 203a. More precisely, the reading unit 212 recognizes a state of open circuit (first state), when the bistable mechanism 203 is in the first stable mechanical configuration and a state of closed circuit (second state), when the bistable mechanism 203 is in the second stable mechanical configuration, with the elastic plate element 203a in contact with the electrode 211. The reading unit 212 consequently determines that the bistable mechanism 3 is, respectively, in the first stable mechanical configuration and in the second stable mechanical configuration.

A shock sensor 300 according to a further embodiment is illustrated in FIGS. 9-11. The shock sensor 300 comprises a supporting body 302, bistable mechanisms 303, a detection device 305 (FIG. 11) and an auxiliary mass 315.

In one embodiment, the bistable mechanisms 303 are made substantially as described with reference to FIGS. 1 and 2 and each comprise a first elastic plate element 303a and a second elastic plate element 303b, joined together at the center by a bridge element 308 and fixed at the respective ends to the supporting body 302 by anchorages 307. Moreover, the bistable mechanisms 303 are provided with respective sharp elements 310. It is understood, however, that also the other types of bistable mechanisms described could be effectively used as well.

The bistable mechanisms 303 have respective first stable mechanical configurations and second stable mechanical configurations. In an initial state, all the bistable mechanisms 303 are in the respective first stable mechanical configuration and switch to the respective second stable mechanical configuration when they are subjected to a impact force higher than a force threshold according to respective axes of detection.

In greater detail, the bistable mechanisms 303 are arranged around the auxiliary mass 315 and are oriented opposed in pairs along a first detection axis X and a second detection axis Y, which are independent (and perpendicular in one embodiment). Two bistable mechanisms 303 are adjacent to respective opposite sides of the auxiliary mass 315 along the first detection axis X, with the respective sharp elements 310 facing away from the auxiliary mass 315. These two bistable mechanisms 303 are activatable by oscillations of the auxiliary mass 315 in opposite directions along the first detection axis X. Another two bistable mechanisms 303 are adjacent to respective opposite sides of the auxiliary mass 315 along the second detection axis Y, with the respective sharp elements 310 facing away from the auxiliary mass 315. These two bistable mechanisms 303 are activatable by oscillations of the auxiliary mass 315 in opposite directions along the second detection axis Y. In some embodiments, a single bistable mechanism for each independent detection axis may be present.

The detection device 305 is coupled to the bistable mechanisms 303 and has a first state, when all the bistable mechanisms 303 are in the first stable mechanical configuration and a second state, when at least one of the bistable mechanisms 303 is in the second stable mechanical configuration.

In greater detail, the detection device 305 comprises conductive structures 311, each coupled to a respective bistable mechanism 303 and a reading unit 312. The conductive structures 311 are made of polycrystalline silicon and comprise structural portions 311a, fixed to the supporting body 302 and facing the respective bistable mechanisms 303. In one embodiment, the structural portions 311a define substantially rectilinear and aligned electrodes. The structural portions 311a of each conductive structure 311 are spaced apart from one another and are connected together by a respective conductive test element 313, which is also made of polycrystalline silicon. More precisely, in each conductive structure 311, the conductive test element 313 is suspended above the supporting body 302 and faces the central portion of the respective bistable mechanism 303, where the sharp element 310 is present.

Moreover, the conductive test element 313 is set at a distance from the respective bistable mechanism 303 such that the sharp element 310 penetrates through the conductive test element 313 itself so as to cause breaking thereof when the bistable mechanism 303 switches from the first stable mechanical configuration to the second stable mechanical configuration.

In FIG. 11, which shows an electrical diagram of the detection device 5, the structural elements 311a are illustrated by symbols representing resistors, whereas the conductive test elements 313 are for simplicity represented with the electrical symbol of a fuse, to indicate that each of them is interrupted, permanently determining a condition of open circuit following upon a significant event (exceeding of the force threshold, in this case).

The reading unit 312 has pairs of terminals connected to the structural elements 311a of a respective conductive structure 311 so as to form electrical circuits that include the respective conductive test elements 313.

The reading unit 312 is moreover configured to recognize in which stable mechanical configuration each bistable mechanism 303 is, on the basis of the state of the respective conductive test element 313. More precisely, the reading unit 312 recognizes a state of closed circuit (first state), when the conductive test element 313 is intact and a state of open circuit (second state), when the conductive test element 313 is interrupted and consequently determines that the corresponding bistable mechanism 303 is in the first stable mechanical configuration and in the second stable mechanical configuration, respectively.

In an alternative embodiment, illustrated in FIG. 12, the conductive structures 311 are connected in series. The reading unit 12 has two terminals connected to as many conductive structures 311 set at the ends of the series so as to form a single electrical circuit comprising all the conductive test elements 313. In this case, the information on the single bistable mechanism 303 is lost, to the advantage, however, of a greater simplicity of the connections.

With reference once again to FIGS. 9 and 10, the shock sensor 300 moreover includes an auxiliary mass 315, which is movable with respect to the supporting body 302 and to the bistable mechanisms 303 and functions as actuator member for the bistable mechanisms 303 themselves. More precisely, the auxiliary mass 315 is constrained to the supporting body 302 by a central anchorage 317 and elastic suspension elements 319, configured so as to allow, for the auxiliary mass 315 a first translational degree of freedom and a second translational degree of freedom with respect to the supporting body 302, respectively, according to the first detection axis X and to the second detection axis Y.

In the resting position, a play is present between the sides of the auxiliary mass 315 and the bistable mechanisms 303, which are respectively adjacent. Alternatively, the sides of the auxiliary mass 315 may be in contact with the respective bistable mechanisms 303.

In the embodiment described, a single auxiliary mass 315 advantageously operates as actuator mechanism for all the bistable mechanisms 303, to which it is not directly constrained and enables detection of shocks along independent detection axes and in opposite directions. As a whole, it is possible to obtain a further saving of area.

According to the embodiment illustrated in FIGS. 13 and 14, a shock sensor 400 comprises a supporting body 402, a bistable mechanism 403, a detection device 405 and an auxiliary mass 415.

The bistable mechanism 403 comprises an elastic membrane 403a made of semiconductor material, set covering a recess 406 made in the supporting body 402. In one embodiment, the elastic membrane 403a is electrically insulated from the supporting body 402 and is capacitively coupled to the auxiliary mass 415, which defines a detection electrode. A further detection electrode is provided at the bottom of the recess 406. The further detection electrode may be defined by a bottom wall 408 of the recess 406, as in the example illustrated, or else by a metal or semiconductor electrode formed on the bottom wall 408 of the recess 406 and electrically insulated therefrom.

In a second configuration exemplified, from the standpoint of the manufacturing process, it is possible to eliminate the bottom electrode.

The elastic membrane 403a is, for example but not necessarily, circular in shape and has a peripheral edge constrained to the supporting body 402, at the margin of the recess 406. In one embodiment, the entire peripheral edge of the elastic membrane 403a is connected to the supporting body 402. As an alternative, the peripheral edge of the elastic membrane 403a is connected to the supporting body 402 only in some stretches so that diametrically opposite end regions are constrained to the supporting body 402.

The elastic membrane 403a is bell-shaped in the first stable mechanical configuration and in the second stable mechanical configuration. More precisely, in the first stable mechanical configuration the elastic membrane 403a has a first concavity facing the recess 406, whereas in the second stable mechanical configuration the elastic membrane 403a has a second concavity facing in a direction opposite to the recess 406.

The detection device 405 is coupled to the bistable mechanism 403 and has a first state, when the bistable mechanism 403 is in the first stable mechanical configuration and a second state, when the bistable mechanism 403 is in the second stable mechanical configuration. In the embodiment described herein, the detection device 405 comprises a capacitor 409, formed by the elastic membrane 403a and by at least the bottom wall 408 of the recess 406, a capacitor 409', formed by the elastic membrane 403a and by the auxiliary mass 415 and a reading unit 412. The capacitor 409 has a capacitance that depends upon the distance between the elastic membrane 403a and the bottom wall of the recess 406. Consequently, the capacitor 409 has a first capacitance C1 (FIG. 11) in the first stable mechanical configuration and a second capacitance C2 (FIG. 12) in the second stable mechanical configuration. The capacitor 409' has a capacitance that depends upon the distance between the elastic membrane 403a and the auxiliary mass 415. Consequently, the capacitor 409' has a first capacitance C1' (FIG. 11) in the first stable mechanical configuration and a second capacitance C2' (FIG. 12) in the second stable mechanical configuration (in both cases, with the auxiliary mass 415 at rest).

The detection unit 412 has terminals connected to respective terminals of the capacitor 409, i.e., in the embodiment described, to the elastic membrane 403a and to the supporting body 402. Likewise, the detection unit 412 has terminals connected to respective terminals of the capacitor 409', i.e., in the embodiment described, to the elastic membrane 403a and to the auxiliary mass 415. In particular, connection with the auxiliary mass 415 may be obtained through anchorages 417 and elastic suspension elements 419 with which the auxiliary mass 415 is constrained to the supporting body 402.

The detection unit 412 is moreover configured to carry out capacitance reading and to recognize in which stable mechanical configuration the bistable mechanism 403 is set, on the basis of the capacitance value read (C1 for the first state and C2 for the second state).

The anchorages 417 and the elastic suspension elements 419 are configured so as to allow, for the auxiliary mass 415, a translational degree of freedom relative to the supporting body 402. In particular, the auxiliary mass 415 is constrained so as to oscillate about a resting position along a detection axis Z, which is perpendicular to the elastic membrane 403a and to a face of the supporting body 402 adjacent to the auxiliary mass 415.

Conveniently, the supporting body 402 and the elastic membrane 403a may be obtained from a first semiconductor wafer and the auxiliary mass 415 with the anchorages 417 may be obtained from a second semiconductor wafer, joined to the semiconductor wafer after preliminary processing steps.

When the shock sensor undergoes a mechanical stress (i.e., an impact), the auxiliary mass 415 oscillates along the detection axis Z and impresses on the elastic membrane 403a an impact force that is proportional to the intensity of the deceleration undergone. If the impact force transmitted by the auxiliary mass 415 exceeds a force threshold, the elastic membrane 403a passes from the first stable mechanical configuration, where it is initially, to the second stable mechanical configuration; otherwise, it returns into the first stable mechanical configuration after undergoing temporary deformation.

Figure 15:
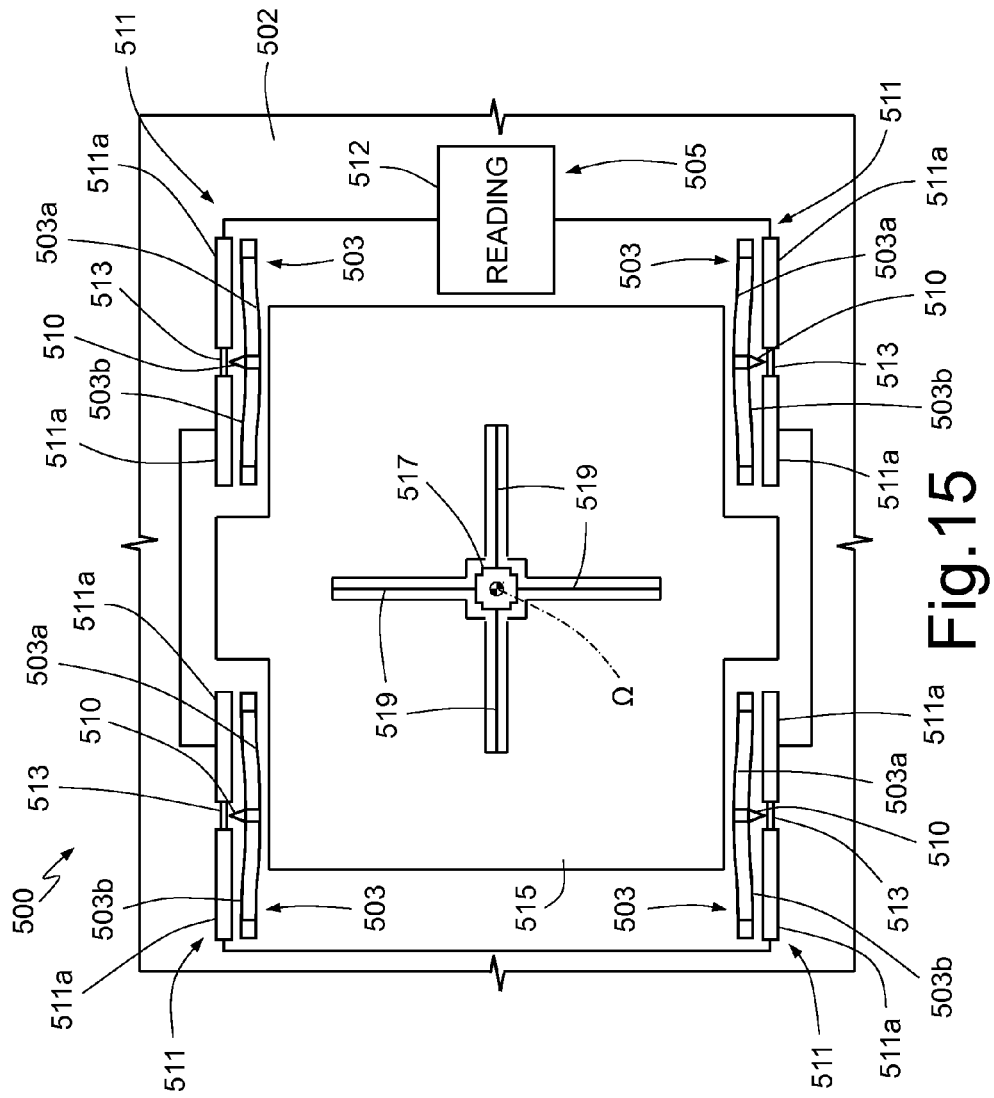
FIG. 15 is a simplified top plan view of a shock sensor according to another embodiment of the present disclosure.

FIG. 15 shows a further embodiment of the disclosure. In this case, a shock sensor 500 comprises a supporting body 502, bistable mechanisms 503, a detection device 505 and an auxiliary mass 515.

The auxiliary mass 515 is constrained to the supporting body 502 by a central anchorage and by elastic suspension elements 519, configured to allow, for the auxiliary mass 515, a rotary degree of freedom with respect to the supporting body 502. In particular, the auxiliary mass 515 is constrained so as to oscillate about an axis Ω passing through the centroid of the auxiliary mass 515 itself, which in this case coincides with the center of the anchorage 517.

The bistable mechanisms 503 are made substantially as described with reference to FIGS. 1 and 2, comprise respective elastic plate elements 503a, 503b with respective sharp elements 510 and are arranged adjacent to respective vertices of the auxiliary mass 515. In particular, the bistable mechanisms 503 are arranged in two symmetrical pairs with respect to the detection axis Ω so that the bistable mechanisms 503 of a first pair are stressed when the auxiliary mass 515 rotates in a clockwise direction and the bistable mechanisms 503 of a second pair are stressed when the auxiliary mass 515 rotates in a counterclockwise direction.

The detection device 505 comprises conductive structures 511, each coupled to a respective bistable mechanism 503, and a reading unit 512. The conductive structures 511 are made of polycrystalline silicon and comprise structural portions 511a, fixed to the supporting body 502 and facing the respective bistable mechanisms 503. The structural portions 511a of each conductive structure 511 are connected together by a respective conductive test element 513. In each conductive structure 511, the conductive test element 513 faces the central portion of the respective bistable mechanism 503, where the sharp element 510 is located. Moreover, the conductive test element 513 is set at a distance from the respective bistable mechanism 503 such that the sharp element 510 penetrates through the conductive test element 513 itself and causes breaking thereof when the bistable mechanism 503 switches from the first stable mechanical configuration to the second stable mechanical configuration.

With reference to FIGS. 16 and 17, a shock sensor 600 comprises a supporting body 602, a bistable mechanism 603 and a detection device 605 coupled to the bistable mechanism 603.

The bistable mechanism 603 comprises an elastic plate element 603a, which also forms part of the detection device 605. In addition to the elastic plate element 603a of the bistable mechanism 603, the detection device 605 comprises an arrest element 609 and a reading unit 612.

The bistable mechanism 603 has a first stable mechanical configuration and a second stable mechanical configuration. The elastic plate element 603a has ends fixed to a surface of the supporting body 602 by anchorages 607 and for the remaining portion is movable parallel to the surface of the supporting body 602 between the first stable mechanical configuration and the second stable mechanical configuration.

In the first stable mechanical configuration, the elastic plate element 603a has an arched shape and defines a first concavity open in a direction opposite to the auxiliary mass 615. In the second stable mechanical configuration (illustrated dashed in FIG. 16), the elastic plate element 603a rests on the arrest element 609 and once again has a shape that is arched at least in some stretches, with at least one second concavity open towards the auxiliary mass 615 (indicated dashed in FIG. 16).

In the detection device 605, the arrest element 609 comprises a sharp element 610 facing the elastic plate element 603a. More precisely, the sharp element 610 is set in such a way as to cause breaking of the elastic plate element 603a during (non-braked) transition from the first stable mechanical configuration to the second stable mechanical configuration as a result of the elastic energy released during the transition itself.

It should be noted in this connection that the second stable mechanical configuration may in practice be reached without sacrificing the elastic plate element 603a just by applying a braking force (for example, a controlled electrostatic force) to attenuate the stresses in the contact against the arrest element 609. It is understood, however, that the second stable mechanical configuration is to all effects a possible stable configuration, even though in effect in use it is not reached because the (non-braked) transition causes the elastic plate element 603a to break. The transition from the first stable mechanical configuration to the second stable mechanical configuration modifies the bistable mechanism, which assumes a new stable mechanical configuration (different from the first stable mechanical configuration and from the second stable mechanical configuration) in which the elastic plate element 603a is interrupted.

The reading unit 612 has terminals connected to the elastic plate element 603a so as to form an electrical circuit open or closed according to whether the bistable mechanism is in the first stable mechanical configuration (with the elastic plate element 603a intact, FIG. 16) or not (with the elastic plate element 603a that has broken during transition to the second stable mechanical configuration, FIG. 17).

The reading unit 612 is moreover configured to recognize whether the bistable mechanism 603 is or is not in the first stable mechanical configuration, on the basis of the state of the circuit including the elastic plate element 603a.

Figure 18:
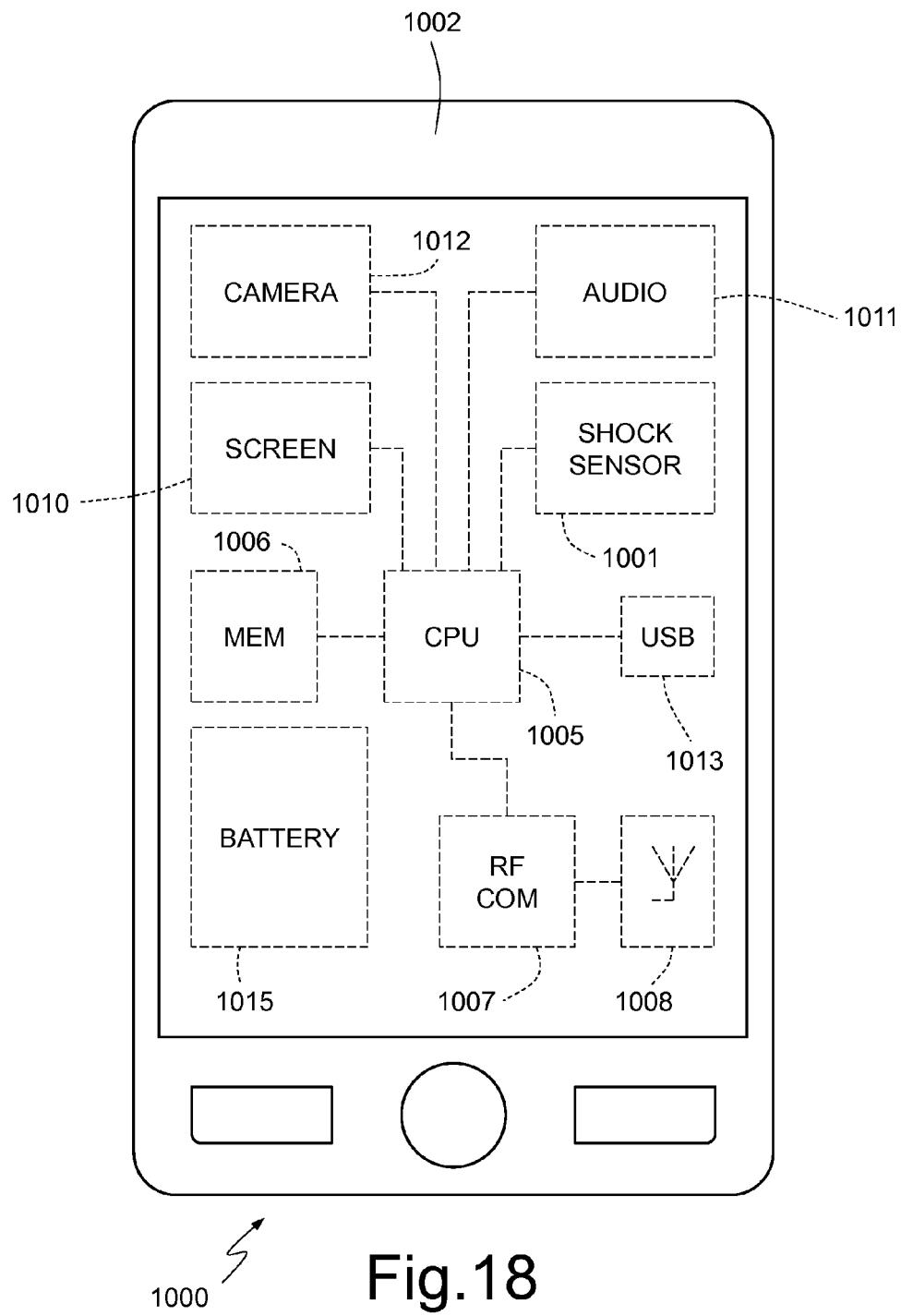
FIG. 18 is a simplified block diagram of an electronic system incorporating a shock sensor.

Illustrated in FIG. 18 is an electronic system 1000, incorporating a shock sensor 1001 according to one of the embodiments described. For example, the shock sensor 1001 is of the type illustrated in FIGS. 9-11.

The electronic system 1000 may be an electronic device of any type, in particular a portable one and supplied autonomously, such as, by way of non-limiting example, a cell phone, a portable computer, a video camera, a photographic camera, a multimedia reader, a portable apparatus for videogames, a motion-activated user interface for computers or consoles for video-games, or a satellite navigation device. In the embodiment of FIG. 16, the electronic system 1000 is a cell phone.

The electronic system 1000 further comprises a casing 1002, to which the shock sensor 1001 is rigidly coupled, a control unit 1005, a storage module 1006, an RF communication module 1007 coupled to an antenna 1008, a screen 1010, an audio module 1011, a filming device 1012, a serial-connection port 1013, for example, a USB port and a battery 1015 for an autonomous power supply. It should be noted that the scope of the present disclosure is not limited to embodiments necessarily having specifically any one of the devices listed or all of them together.

Modifications and variations may be made to the shock sensor and to the method described, without thereby departing from the scope of the present invention.

For example, the bistable mechanisms may have a configuration different from the ones described and, in particular, may be based upon systems of three or more elastic elements, possibly connected together by one or more bridge elements.

The auxiliary mass could also not have a quadrangular configuration. For example, the auxiliary mass may have six faces or more, or the shock sensor may comprise a bistable mechanism for each face of the auxiliary mass to increase the isotropy of response in the plane).

Shock sensors comprising a plurality of bistable mechanisms may be obtained using any type of bistable mechanism and corresponding detection device from among the ones described. In the case where a detection device of a capacitive type is used, the capacitors formed by the bistable mechanisms and by the corresponding electrodes of the detection device may be read individually or else connected together in parallel.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A shock sensor comprising:
a supporting body;
a bistable mechanism configured to switch from a first configuration to a second configuration in response to a shock force that is applied to a detection axis and is greater than a threshold value, the bistable mechanism including an elastic element that is coupled to the supporting body by at least two peripheral regions the elastic element being independently stable in the first configuration and the second configuration and defining a first concavity in the first configuration and a second concavity, opposite to the first concavity, in the second configuration;
an electrode capacitively coupled to the elastic element to form a capacitor; and
a detection device coupled to the bistable mechanism, and having a first state when the bistable mechanism is in the first configuration, and a second state after the bistable mechanism has switched from the first configuration to the second configuration.

2. The shock sensor according to claim 1, wherein:
the bistable mechanism is adjacent to at least a portion of the detection device;
the first concavity is open at a first side of the elastic element facing the detection device; and
the second concavity is open at a second side of the elastic element opposite to the detection device.

3. The shock sensor according to claim 1, comprising an auxiliary mass configured to cooperate with the bistable mechanism to switch the bistable mechanism from the first configuration to the second configuration in response to the shock force.

4. The shock sensor according to claim 3, wherein the auxiliary mass is rigidly coupled to the bistable mechanism.

5. The shock sensor according to claim 3, wherein the auxiliary mass is movable with respect to the supporting body and to the bistable mechanism.

6. The shock sensor according to claim 5, wherein the auxiliary mass is coupled to the supporting body through elastic elements configured to provide the auxiliary mass at least one degree of freedom with respect to the supporting body.

7. The shock sensor according to claim 6, wherein the elastic elements are configured to provide the auxiliary mass a first degree of freedom and a second degree of freedom with respect to the supporting body according to respectively independent first detection axis and second detection axis.

8. The shock sensor according to claim 7, wherein the bistable mechanism is two first bistable mechanisms, respectively arranged adjacent to first and second sides of the auxiliary mass and activatable by oscillations of the auxiliary mass in opposite directions.

9. The shock sensor according to claim 8, comprising two second bistable mechanisms, respectively arranged adjacent to third and fourth sides of the auxiliary mass and activatable by oscillations of the auxiliary mass in opposite directions; wherein the first bistable mechanisms are activatable by oscillations of the auxiliary mass in opposite directions according to the first detection axis and the second bistable mechanisms are activatable by oscillations of the auxiliary mass in opposite directions according to the second detection axis.

10. The shock sensor according to claim 1, wherein the bistable mechanism is a first bistable mechanism, the shock sensory comprising a second bistable mechanism arranged adjacent to the auxiliary mass, the first bistable mechanism being activatable by clockwise oscillations of the auxiliary mass about the detection axis, and the second bistable mechanism being activatable by counter-clockwise oscillations of the auxiliary mass about the detection axis.

11. The shock sensor according to claim 1, wherein the elastic element is a flexible beam of a semiconductor material having an arched shape in the first configuration and in the second configuration, and having opposite ends fixed to the supporting body.

12. The shock sensor according to claim 1, wherein the bistable mechanism includes a first plate elastic element and a second plate elastic element defined by respective flexible beams of a semiconductor material and having an arched shape in the first configuration and in the second configuration and having opposite ends fixed to the supporting body.

13. The shock sensor according to claim 12, wherein the bistable mechanism includes at least a bridge element coupling the first plate elastic element and the second plate elastic element.

14. A shock sensor comprising:
a supporting body;
a bistable mechanism configured to switch from a first configuration to a second configuration in response to a shock force that is applied to a detection axis and is greater than a threshold value, the bistable mechanism including an elastic element that is coupled to the supporting body by at least two peripheral regions the elastic element being independently stable in the first configuration and the second configuration and defining a first concavity in the first configuration and a second concavity, opposite to the first concavity, in the second configuration, the elastic element including an elastic membrane, of a semiconductor material, arranged to cover a recess in the supporting body; and
a detection device coupled to the bistable mechanism, and having a first state when the bistable mechanism is in the first configuration, and a second state after the bistable mechanism has switched from the first configuration to the second configuration.

15. The shock sensor according to claim 14, wherein the elastic membrane has a peripheral edge constrained to the supporting body at a margin of the recess.

16. The shock sensor according to claim 14, wherein the elastic membrane is bell-shaped in the first configuration and in the configuration.

17. The shock sensor according to claim 1, wherein:
the conductive structure includes an electrode structure capacitively coupled to the elastic element and a capacitance between the electrode structure and the elastic element has a first value in the first state and a second value, different from the first value, in the second state.

18. The shock sensor according to claim 17, wherein the detection device includes a reading unit configured to determine a state of the detection device based on a capacitance value of the conductive structure.

19. The shock sensor according to claim 1, wherein the initial configuration is the first configuration and the final configuration is the second configuration.

20. An electronic system comprising:
a control unit; and
a shock sensor coupled to the control unit, the shock sensor including:
a supporting body;
a bistable mechanism that includes opposing ends that are coupled to the supporting body, the bistable mechanism being configured to switch from a first configuration to a second configuration in response to a shock force that is applied along a detection axis of the supporting body and is greater than a threshold value, the bistable mechanism forming a first concavity in the first configuration and a second concavity, symmetrically mirrored to the first concavity, in the second configuration;
a detection device coupled to the bistable mechanism and including a conductive structure and configured to measure a first value when the bistable mechanism is in the first configuration, and a second, different value when the bistable mechanism has switched from the first configuration to the second configuration; and
a sharp element included in the bistable mechanism that is carried by the elastic element, the sharp element being configured to cause the conductive structure to break when the bistable mechanism switches from the first configuration to the second configuration.

21. The electronic system according to claim 20 wherein the bistable mechanism includes a test element that is configured to break when the bistable mechanism switches from the first configuration to the second configuration.

22. The electronic system according to claim 20 wherein the detection device includes a conductive structure that is capactively coupled to the bistable mechanism, the conductive structure including a test element that is configured to be broken by the sharp element as the bistable mechanism switches from the first configuration to the second configuration.

23. The electronic system according to claim 20 wherein the bistable mechanism includes plurality of linear plates and the bistable mechanism further includes an auxiliary mass coupled to at least one of the linear plates.

24. A method of shock detection comprising: allowing a bistable mechanism to be in an initial configuration in which an elastic element of the bistable mechanism is in an independently stable first concave position that faces a first direction; exposing the bistable mechanism to a shock force, and when the shock force is greater than a threshold value causing the bistable mechanism to switch to a final configuration in which the elastic element of the bistable mechanism is in an independently stable second concave position that faces a second direction, opposite the first direction, and when the shock force is less than threshold value maintaining the bistable mechanism in the initial configuration; and sensing whether the bistable mechanism is in the initial stable configuration or in the final stable configuration by sensing a capacitance value between the electrode structure and the elastic element when the bistable mechanism is in the initial configuration, and sensing a zero capacitance value when the bistable mechanism is in the final configuration.

25. The method according to claim 24, wherein:
causing the bistable mechanism to switch to the final configuration in which the elastic element of the bistable mechanism is in the second concave position that faces the second direction, opposite the first direction comprises breaking a conductive structure; and
wherein measuring an electrical parameter to determine whether the bistable mechanism is in the initial stable configuration or in the final stable configuration comprises checking whether the conductive structure is intact.

26. A shock sensor comprising:
a supporting body;
a bistable mechanism configured to switch from a first configuration to a second configuration in response to a shock force that is applied to a detection axis and is greater than a threshold value, the bistable mechanism including an elastic element that is coupled to the supporting body by at least two peripheral regions and defining a first concavity in the first configuration and a second concavity, opposite to the first concavity, in the second configuration;
a detection device coupled to the bistable mechanism and including a conductive structure, and having a first state when the bistable mechanism is in the first configuration, and a second state after the bistable mechanism has switched from the first configuration to the second configuration; and
a sharp element included in the bistable mechanism, that is carried by the elastic element, the sharp element being configured to cause the conductive structure to break when the bistable mechanism switches from the first configuration to the second configuration.

27. The shock sensor according to claim 26, wherein the sharp element is arranged in a region of the elastic element that has a maximum displacement between the first configuration and the second configuration.

28. The shock sensor according to claim 27, wherein the conductive structure comprises a test conductive element and structural portions coupled to one another by the test conductive element, the structural portions being suspended above the supporting body and facing the bistable mechanism at such a distance that the sharp element is configured to penetrate through and break the test conductive element, when the bistable mechanism switches from the first configuration to the second configuration.

29. The shock sensor according to claim 27, wherein the detection device includes a reading unit configured to determine a state of the detection device based on a resistance value of the conductive structure.

30. A shock sensor comprising:
a supporting body;
a bistable mechanism configured to switch from a first configuration to a second configuration in response to a shock force that is applied to a detection axis and is greater than a threshold value, the bistable mechanism including an elastic element that is coupled to the supporting body by at least two peripheral regions and defining a first concavity in the first configuration and a second concavity, opposite to the first concavity, in the second configuration;
a detection device coupled to the bistable mechanism, and having a first state when the bistable mechanism is in the first configuration, and a second state after the bistable mechanism has switched from the first configuration to the second configuration; and
a stop element arranged and configured to cause the elastic element to break when the bistable mechanism switches from the first configuration to the second configuration; and
wherein the detection device comprises a reading unit configured to determine a state of the detection device based on a resistance value of the elastic element.

31. The shock sensor according to claim 30, wherein the detection devices has a third state when the elastic element breaks.

* * * * *